United States Patent
Cheng et al.

(10) Patent No.: US 10,396,664 B2
(45) Date of Patent: Aug. 27, 2019

(54) REDUNDANT POWER SUPPLY CONTROL CIRCUIT

(71) Applicant: PEGATRON CORPORATION, Taipei (TW)

(72) Inventors: Ming-Chia Cheng, Taipei (TW); Hao-Ming Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 117 days.

(21) Appl. No.: 15/649,315

(22) Filed: Jul. 13, 2017

(65) Prior Publication Data

US 2018/0062517 A1   Mar. 1, 2018

(30) Foreign Application Priority Data

Aug. 25, 2016 (TW) .............................. 105127202 A (51) Int. Cl.
*H02M 3/158* (2006.01)
*H02H 7/12* (2006.01)
(Continued)

(52) U.S. Cl.
CPC .......... *H02M 3/158* (2013.01); *H02H 7/1213* (2013.01); *H02H 9/001* (2013.01); *H02H 9/004* (2013.01); *H02J 1/00* (2013.01); *H02J 1/06* (2013.01); *H02J 1/10* (2013.01); *H02J 1/108* (2013.01); *H02J 9/06* (2013.01); *H02J 2009/068* (2013.01)

(58) Field of Classification Search
CPC ..... H02M 3/158; H02H 7/1213; H02H 9/001; H02H 9/004; H02J 1/00; H02J 1/06

USPC ........................................................... 307/52
See application file for complete search history.

(56) References Cited

U.S. PATENT DOCUMENTS 5,982,645 A * 11/1999 Levran ................ H01F 27/2866
                                                    363/37
6,225,797 B1   5/2001 Willis et al.
(Continued)

FOREIGN PATENT DOCUMENTS

EP          2854281      4/2015
TW         201445854   12/2014
(Continued)

OTHER PUBLICATIONS

"Search Report of Europe Counterpart Application", dated Dec. 6, 2017, p. 1-p. 8.

*Primary Examiner* — Daniel Kessie
*Assistant Examiner* — Swarna N Chowdhuri
(74) *Attorney, Agent, or Firm* — J.C. Patents (57) ABSTRACT

A redundant power supply control circuit including a power isolating circuit and a soft start circuit is provided. The power isolating circuit is configured to isolate a first power provided by a first power device from a second power provided by a second power device. When the first power is provided to the redundant power supply control circuit, the power isolating circuit outputs the first power as a main power, and otherwise, the power isolating circuit outputs the second power to a load. The soft start circuit is coupled to the power isolating circuit to receive the main power. The soft start circuit is enabled after the soft start circuit receives the main power, such that the soft start circuit outputs the main power to the load.

8 Claims, 2 Drawing Sheets

(51) Int. Cl.
*H02H 9/00* (2006.01)
*H02J 1/00* (2006.01)
*H02J 1/06* (2006.01)
*H02J 1/10* (2006.01)
*H02J 9/06* (2006.01)

(56) References Cited

U.S. PATENT DOCUMENTS

2005/0036248 A1* 2/2005 Klikic .................... H02J 9/062
 361/42
2016/0195911 A1 7/2016 Chapel et al.

FOREIGN PATENT DOCUMENTS

TW 201614928 4/2016
WO 2016118972 7/2016

* cited by examiner

REDUNDANT POWER SUPPLY CONTROL CIRCUIT

CROSS-REFERENCE TO RELATED APPLICATION

This application claims the priority benefit of Taiwan application serial no. 105127202, filed on Aug. 25, 2016. The entirety of the above-mentioned patent application is hereby incorporated by reference herein and made a part of this specification.

BACKGROUND

Technology Field

The disclosure relates to a power control circuit and more particularly, to a redundant power supply control circuit.

Description of Related Art

Generally, a redundant power supply system usually may have at least two power supply modules, and one of the at least two power supply modules is selected to supply a power to a load of the redundant power supply system. In a parallel output voltage connection structure, diodes or transistors may be connected in series between an output terminal of each power supply module and the load, so as to prevent a voltage or a current of the power supply module which provides the power to the load from flowing back to other power supply modules. However, the diodes in a turned-on state consume more power, which easily results in overheating the redundant power supply system and reduced power supply efficiency of the redundant power supply system. In addition, an inrush current easily occurring in a transient moment when the power supply module provides the power may cause a dramatic change to an output voltage and damage to the load. Moreover, if the voltage provided by the power supply module is too high, the internal circuit of the redundant power supply system or the load may be damaged.

SUMMARY

In light of the foregoing, the disclosure provides a redundant power supply control circuit with protection mechanisms, including over-voltage protection, inrush current suppression and flowing-back voltage/current prevention.

A redundant power supply control circuit for providing a power to a load is provided by the disclosure. The redundant power supply control circuit includes a power isolating circuit and a soft start circuit. The power isolating circuit is configured to receive at least one of a first power from a first power device and a second power from a second power device and configured to isolate the first power from the second power. When the first power is provided, the power isolating circuit outputs the first power as a main power and isolates the second power from the load. When the first power is not provided, the power isolating circuit outputs the second power to the load. The soft start circuit is coupled to the power isolating circuit to receive the main power. The soft start circuit is enabled after receiving the main power, so as to output the main power to the load.

In an embodiment of the disclosure, the power isolating circuit includes a first isolating circuit and a second isolating circuit. The first isolating circuit is configured to receive the first power from the first power device and coupled to the soft start circuit. When the first power is provided, the first isolating circuit outputs the first power as the main power. When the first power is not provided, the first isolating circuit disconnects a current path between the soft start circuit and the first power device. The second isolating circuit is configured to receive the second power from the second power device and coupled to the load. When the first power is provided, the second isolating circuit disconnects a current path between the load and the second power device. When the first power is not provided, the second isolating circuit outputs the second power to the load.

In an embodiment of the disclosure, the first isolating circuit includes a first switch circuit and a first control circuit. A first terminal of the first switch circuit is configured to receive the first power, and a second terminal of the first switch circuit is coupled to the soft start circuit. An input terminal of the first control circuit is configured to receive the first power, and an output terminal of the first control circuit is coupled to a control terminal of the first switch circuit to control turning-on and turning-off of the first switch circuit. When the first power is provided, the first control circuit generates a first switch signal to turn on the first switch circuit, or otherwise, the first control circuit generates the first switch signal to turn off the first switch circuit.

In an embodiment of the disclosure, the second isolating circuit includes a second switch circuit and a second control circuit. A first terminal of the second switch circuit is configured to receive the second power, and a second terminal of the second switch circuit is coupled to the load. A first input terminal of the second control circuit is coupled to the soft start circuit, a second input terminal of the second control circuit is coupled to the first control circuit to receive the first switch signal, and an output terminal of the second control circuit is coupled to a control terminal of the second switch circuit to control turning-on and turning-off of the second switch circuit. When the first power is provided, the second control circuit turns off the second switch circuit according to the first switch signal, or otherwise, the second control circuit turns on the second switch circuit.

In an embodiment of the disclosure, the soft start circuit includes a third switch circuit and a third control circuit. A first terminal of the third switch circuit is coupled to the load, and a second terminal of the third switch circuit is coupled to the power isolating circuit. The third control circuit is configured to receive the first power and coupled to a control terminal of the third switch circuit to control turning-on and turning-off of the third switch circuit. When the first power is provided, the third control circuit generates a third switch signal to turn on the third switch circuit, or otherwise, the third control circuit generates the third switch signal to turn off third switch circuit.

In an embodiment of the disclosure, the redundant power supply control circuit further includes an over-voltage protection circuit. The over-voltage protection circuit is coupled to the soft start circuit and configured to generate a fourth switch signal to disable the soft start circuit when a voltage level of the first power is greater than an over-voltage protection level, such that the soft start circuit stops outputting the main power.

Based on the above, the redundant power supply control circuit provided by the embodiments of the disclosure can prevent the voltage or the current of the first power from the first power device from flowing back to the second power device and prevent the voltage or the current of the second power from the second power device from flowing back to the first power device. When the first power is provided, the soft start circuit in the redundant power supply control circuit can be enabled after receiving the main power (i.e., the first power), so as to progressively output the main power to the load, thereby suppressing an inrush current in an transient moment when the first power is provided. In addition, when the voltage level of the first power (i.e., the main power) is too high, the over-voltage protection circuit in the redundant power supply control circuit can disable the soft start circuit from outputting the main power, so as to prevent the internal circuit in the redundant power control circuit or the load from being damaged due to the overhigh voltage level of the first power (i.e., the main power).

In order to make the aforementioned and other features and advantages of the disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

In order to make the disclosure more comprehensible, embodiments are described below as examples showing that the disclosure can actually be realized. Wherever possible, the same reference numbers are used in the drawings and the description to refer to the same or like parts.

Figure 1:
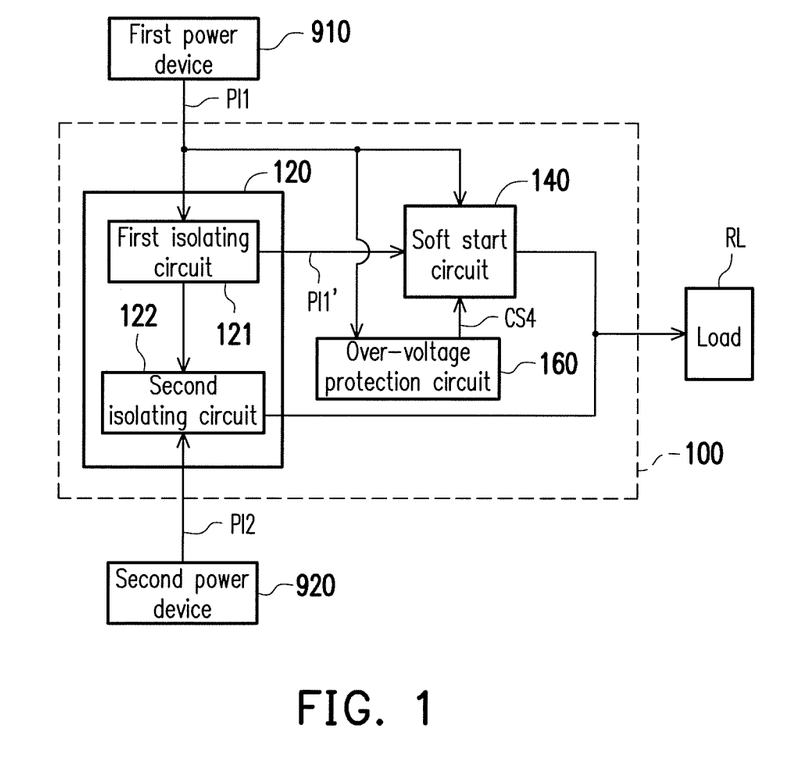
FIG. 1 is a schematic circuit block diagram illustrating a redundant power supply control circuit according to an embodiment of the disclosure.

FIG. 1 is a schematic circuit block diagram illustrating a redundant power supply control circuit 100 according to an embodiment of the disclosure. Referring to FIG. 1, a redundant power supply control circuit 100 may include a power isolating circuit 120 and a soft start circuit 140, but the disclosure is not limited thereto. In other embodiments of the disclosure, the redundant power supply control circuit 100 may further include an over-voltage protection circuit 160, which will be described in detail below.

The power isolating circuit 120 is configured to receive a first power PI1 from a first power device 910 and configured to receive a second power PI2 from a second power device 920. When the first power PI1 is provided, the power isolating circuit 120 may output the first power PI1 as a main power PI1' and provide the main power PI1' to the soft start circuit 140. In contrast, when the first power PI1 is not provided, the power isolating circuit 120 may output the second power PI2 to a load RL. In addition, the power isolating circuit 120 may be configured to isolate the first power PI1 from the second power PI2 to prevent a voltage or a current of the first power PI1 from flowing back to the second power device 920 and prevent a voltage or a current of the second power PI2 from flowing back to the first power device 910.

The soft start circuit 140 is coupled to the power isolating circuit 120 to receive the main power PI1'. The soft start circuit 140 is enabled after receiving the main power PI1', so as to progressively output the main power PI1' to the load RL, thereby suppressing an inrush current generated in a transient moment when the first power PI1 is provided.

In an embodiment of the disclosure, the first power device 910 may be, for example, a power adaptor capable of providing a direct-current (DC) first power PI1, the second power device 920 may be, for example, a powered device (PD) of a power over Ethernet (PoE), which is capable of providing the second power PI2 through a network line (e.g., a twisted pair), and the load RL may be, for example, a DC-to-DC conversion circuit disposed inside a wireless base station (e.g., a Wi-Fi access point (AP)), which may be configured to generate various DC powers required for the operations of the wireless base station, but the disclosure is not limited thereto.

The power isolating circuit 120 may include a first isolating circuit 121 and a second isolating circuit 122. The first isolating circuit 121 is configured to receive the first power PI1 from the first power device 910 and is coupled to the soft start circuit 140. The second isolating circuit 122 is configured to receive the second power PI2 from the second power device 920 and is coupled to the load RL.

When the first power PI1 is provided, the first isolating circuit 121 outputs the first power PI1 as the main power PI1' and progressively outputs the main power PI1' to the load RL through the soft start circuit 140. In this circumstance, the second isolating circuit 122 disconnects a current path between the load RL and the second power device 920 to prevent the voltage or the current of the main power PI1' (i.e., the first power PI1) provided to the load RL from flowing back to the second power device 920 through the second isolating circuit 122.

In contrast, when the first power PI1 is not provided, the second isolating circuit 122 may output the second power PI2 to the load RL. In this circumstance, the first isolating circuit 121 disconnects a current path between the soft start circuit 140 and the first power device 910 to prevent the voltage or the current of the second power PI2 provided to the load RL from flowing back to the first power device 910 through the soft start circuit 140 and the first isolating circuit 121.

Figure 2:
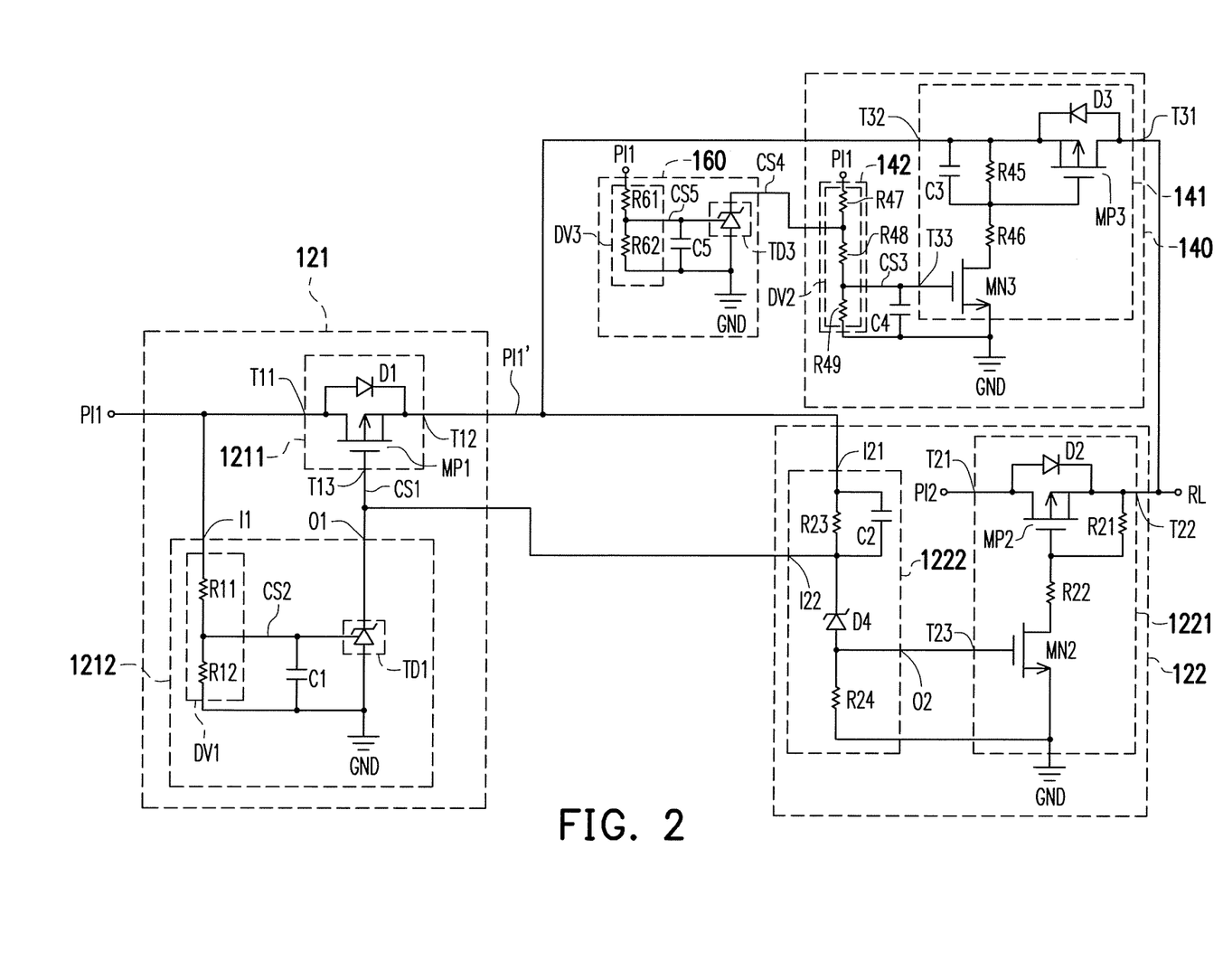
FIG. 2 is a schematic circuit structure diagram illustrating the redundant power supply control circuit depicted in FIG. 1.

FIG. 2 is a schematic circuit structure diagram illustrating the redundant power supply control circuit 100 depicted in FIG. 1. Referring to FIG. 2, the first isolating circuit 121 may include a first switch circuit 1211 and a first control circuit 1212. A first terminal T11 of the first switch circuit 1211 is configured to receive the first power PI1. A second terminal T12 of the first switch circuit 1211 is coupled to the soft start circuit 140 to provide the main power PI1'. An input terminal I1 of the first control circuit 1212 is configured to receive the first power PI1. An output terminal O1 of the first control circuit 1212 is coupled to a control terminal T13 of the first switch circuit 1211 to control turning-on and turning-off of the first switch circuit 1211. When the first power PI1 is provided, the first control circuit 1212 generates a first switch signal CS1 to turn on the first switch circuit 1211. When the first power PI1 is not provided, the first control circuit 1212 generates the first switch signal CS1 to turn off the first switch circuit 1211.

In an embodiment of the disclosure, as illustrated in FIG. 2, the first switch circuit 1211 may include a P-type metal oxide semiconductor field effect transistor (P-type MOSFET) MP1, but the disclosure is not limited thereto. In other embodiments of the disclosure, the first switch circuit 1211 may also be implemented by using an N-type metal oxide semiconductor field effect transistor (N-type MOSFET). A drain terminal of the P-type MOSFET MP1 is coupled to the first terminal T11 of the first switch circuit 1211 to receive the first power PI1. A source terminal of the P-type MOSFET MP1 is coupled to the second terminal T12 of the first switch circuit 1211 to output the main power PI1'. A parasitic diode D1 of the P-type MOSFET MP1 may be between the drain terminal and the source terminal of the P-type MOSFET MP1. An anode terminal of the parasitic diode D1 is the drain terminal of the P-type MOSFET MP1, and a cathode terminal of the parasitic diode D1 is the source terminal of the P-type MOSFET MP1.

In an embodiment of the disclosure, as illustrated in FIG. 2, the first control circuit 1212 may include a voltage dividing circuit DV1 and a regulating triode TD1. The voltage dividing circuit DV1 is coupled between the input terminal I1 of the first control circuit 1212 and a ground terminal GND and is configured to divide the voltage of the first power PI1 to generate a second switch signal CS2. In an embodiment of the disclosure, the voltage dividing circuit DV1 may be implemented by resistors R11 and R12 connected in series, and the second switch signal CS2 is generated at a common point of the resistors R11 and R12, but the disclosure is not limited thereto.

An anode terminal of the regulating triode TD1 is coupled to the ground terminal GND, a cathode terminal of the regulating triode TD1 is coupled to the output terminal O1 of the first control circuit 1212, and a control terminal of the regulating triode TD1 is configured to receive the second switch signal CS2. In an embodiment of the disclosure, a capacitor C1 may be connected between the control terminal and the anode terminal of the regulating triode TD1, but the disclosure is not limited thereto. In an embodiment of the disclosure, the regulating triode TD1 may be implemented by a TL431 regulating element.

In an embodiment of the disclosure, as illustrated in FIG. 2, the second isolating circuit 122 may include a second switch circuit 1221 and a second control circuit 1222. A first terminal T21 of the second switch circuit 1221 is configured to receive the second power PI2. A second terminal T22 of the second switch circuit 1221 is coupled to the load RL. A first input terminal I21 of the second control circuit 1222 is coupled between the soft start circuit 140 and the first isolating circuit 121 to receive the main power PI1'. A second input terminal I22 of the second control circuit 1222 is coupled to the output terminal O1 of the first control circuit 1212 to receive the first switch signal CS1. An output terminal O2 of the second control circuit 1222 is coupled to a control terminal T23 of the second switch circuit 1221 to control turning-on and turning-off of the second switch circuit 1221. When the first power PI1 (i.e., the main power PI1') is provided, the second control circuit 1222 may turn off the second switch circuit 1221 according to the first switch signal CS1 to disconnect the current path between the load RL and the second power device 920. When the first power PI1 (i.e., the main power PI1') is not provided, the second control circuit 1222 may turn on the second switch circuit 1221, such that the second power PI2 may be transmitted to the load RL through the second switch circuit 1221.

In an embodiment of the disclosure, as illustrated in FIG. 2, the second switch circuit 1221 may include a P-type MOSFET MP2, a first resistor R21, a second resistor R22 and an N-type MOSFET MN2, but the disclosure is not limited thereto. A drain terminal of the P-type MOSFET MP2 is coupled to the first terminal T21 of the second switch circuit 1221 to receive the second power PI2. A source terminal of the P-type MOSFET MP2 is coupled to the second terminal T22 of the second switch circuit 1221. A parasitic diode D2 of the P-type MOSFET MP2 is between the drain terminal and the source terminal of the P-type MOSFET MP2. An anode terminal of the parasitic diode D2 is the drain terminal of the P-type MOSFET MP2, and a cathode terminal of the parasitic diode D2 is the source terminal of the P-type MOSFET MP2.

A first terminal of the first resistor R21 is coupled to the source terminal of the P-type MOSFET MP2. A second terminal of the first resistor R21 is coupled to a gate terminal of the P-type MOSFET MP2. A first terminal of the second resistor R22 is coupled to the gate terminal of the P-type MOSFET MP2. A second terminal of the second resistor R22 is coupled to a drain terminal of the N-type MOSFET MN2. A source terminal of the N-type MOSFET MN2 is coupled to the ground terminal GND. A gate terminal of the N-type MOSFET MN2 is coupled to the control terminal T23 of the second switch circuit 1221.

In an embodiment of the disclosure, as illustrated in FIG. 2, the second control circuit 1222 may include a third resistor R23, a regulating diode D4 and a fourth resistor R24, but the disclosure is not limited thereto. In an embodiment of the disclosure, a capacitor C2 may be further connected between two terminals of the third resistor R23. A first terminal of the third resistor R23 is coupled to the first input terminal I21 of the second control circuit 1222. A second terminal of the third resistor R23 is coupled to the second input terminal I22 of the second control circuit 1222. A cathode terminal of the regulating diode D4 is coupled to the second input terminal I22 of the second control circuit 1222. An anode terminal of the regulating diode D4 is coupled to the output terminal O2 of the second control circuit 1222. A first terminal of the fourth resistor R24 is coupled to the output terminal O2 of the second control circuit 1222. A second terminal of the fourth resistor R24 is coupled to the ground terminal GND.

In an embodiment of the disclosure, as illustrated in FIG. 2, the soft start circuit 140 may include a third switch circuit 141 and a third control circuit 142. A first terminal T31 of the third switch circuit 141 is coupled to the load RL. A second terminal T32 of the third switch circuit 141 is coupled to the power isolating circuit 120 to receive the main power PI1'. The third control circuit 142 is configured to receive the first power PI1 and is coupled to a control terminal T33 of the third switch circuit 141 to control turning-on and turning-off of the third switch circuit 141. In an embodiment of the disclosure, a capacitor C4 may be coupled between the control terminal T33 of the third switch circuit 141 and the ground terminal GND, but the disclosure is not limited thereto.

When the first power PI1 is provided, the third control circuit 142 may generate a third switch signal CS3 to turn on the third switch circuit 141, such that the third switch circuit 141 may transmit the main power PI1' to the load RL. When the first power PI1 is not provided, the third control circuit 142 may generate the third switch signal CS3 to turn off the third switch circuit 141.

In an embodiment of the disclosure, as illustrated in FIG. 2, the third switch circuit 141 may include a P-type MOSFET MP3, a fifth resistor R45, a sixth resistor R46 and an N-type MOSFET MN3, but the disclosure is not limited thereto. In an embodiment of the disclosure, a capacitor C3 may be further connected between two terminals of the fifth resistor R45. A drain terminal of the P-type MOSFET MP3 is coupled to the first terminal T31 of the third switch circuit 141. A source terminal of the P-type MOSFET MP3 is coupled to the second terminal T32 of the third switch circuit 141. A parasitic diode D3 of the P-type MOSFET MP3 is between the drain terminal and the source terminal of the P-type MOSFET MP3. An anode terminal of the parasitic diode D3 is the drain terminal of the P-type MOSFET MP3, and a cathode terminal of the parasitic diode D3 is the source terminal of the P-type MOSFET MP3.

A first terminal of the fifth resistor R45 is coupled to the source terminal of the P-type MOSFET MP3. A second terminal of the fifth resistor R45 is coupled to a gate terminal of the P-type MOSFET MP3. A first terminal of the sixth resistor R46 is coupled to the gate terminal of the P-type MOSFET MP3. A second terminal of the sixth resistor R46 is coupled to a drain terminal of the N-type MOSFET MN3. A source terminal of the N-type MOSFET MN3 is coupled to the ground terminal GND. A gate terminal of the N-type MOSFET MN3 is coupled to the control terminal T33 of the third switch circuit 141.

In an embodiment of the disclosure, as illustrated in FIG. 2, the third control circuit 142 may include a voltage dividing circuit DV2 configured to divide the voltage of the first power PI1 to generate the third switch signal CS3. The voltage dividing circuit DV2 may include resistors R47, R48 and R49 connected in series. A first terminal of the resistor R47 is configured to receive the first power PI1. A second terminal of the resistor R47 is coupled to a first terminal of the resistor R48. A second terminal of the resistor R48 is coupled to a first terminal of the resistor R49 to generate the third switch signal CS3. A second terminal of the resistor R49 is coupled to the ground terminal GND.

Description related to the operation of the redundant power supply control circuit 100 will be set forth hereinafter. Referring to FIG. 1 and FIG. 2 simultaneously, it is assumed herein that a voltage level of the first power PI1 is greater than a voltage level of the second power PI2. When the first power device 910 and the second power device 920 simultaneously provide power to the redundant power supply control circuit 100 (i.e., both the first power PI1 and the second power PI2 are provided), the first power PI1 from the first power device 910 is preferentially provided to the load RL. The redundant power supply control circuit 100 provides the second power PI2 from the second power device 920 to the load RL only if the first power device 910 stops providing the power. Specially, in a condition that the second power device 920 provides the power, no matter whether the first power device 910 provides the power, the redundant power supply control circuit 100 may continuously provide the power to the load RL, such that power outage may be prevented from occurring to the redundant power supply control circuit 100 during the switching between the first power PI1 and the second power PI2, thereby preventing the load RL (or an electronic apparatus in which the load RL is installed) from being shut down.

To be specific, in a condition that the second power PI2 is provided, the first power PI1 may be transmitted to the soft start circuit 140 to serve as the main power PI1' through the parasitic diode D1 inside the P-type MOSFET MP1 (which is located in the first isolating circuit 121) when the first power PI1 is provided. In this circumstance, the parasitic diode D3 inside the P-type MOSFET MP3 (which is located in the soft start circuit 140) is reversely biased, and thus, the main power PI1' is incapable of being provided to the load RL through the parasitic diode D3.

In the aforementioned situation, the voltage of the first power PI1 may be divided by the resistors R47, R48 and R49 (which are located in the soft start circuit 140) to generate the third switch signal CS3. When a voltage level of the third switch signal CS3 is greater than a threshold of the N-type MOSFET MN3, the N-type MOSFET MN3 may be turned on, such that the voltage of the main power PI1' may be divided by the fifth resistor R45 and the sixth resistor R46 to turn on the P-type MOSFET MP3. In this circumstance, the main power PI1' may be transmitted to the load RL through the turned-on P-type MOSFET MP3.

Then, the voltage of the first power PI1 may be divided by the resistors R11 and R12 (which are located in the first isolating circuit 121) to generate the second switch signal CS2. When a voltage level of the second switch signal CS2 is greater than a threshold of the regulating triode TD1, the regulating triode TD1 may be turned on, such that a voltage level of the first switch signal CS1 is equal to a voltage level of the ground terminal GND (which is a logic-low voltage level, for example) to turn on the P-type MOSFET MP1. In this circumstance, the first power PI1 may be transmitted to the soft start circuit 140 through a sensing channel inside the P-type MOSFET MP1. Since an impedance value of the sensing channel inside the P-type MOSFET MP1 is small, and a power consumption thereof is lower than that of the parasitic diode D1, the power supply efficiency of the redundant power supply control circuit 100 may be enhanced.

It is worth mentioned that the P-type MOSFET MP3 is turned on by the fifth resistor R45 and the sixth resistor R46 in the soft start circuit 140 after receiving the main power PI1' to provide the power to the load RL, and thus, the inrush current occurring in the transient moment when the first power PI1 is provided may be reduced in this way, thereby preventing the load RL from being damaged. Additionally, since an impedance value of the turned-on P-type MOSFET MP3 is small, and a power consumption thereof is lower than that of an ordinary diode, the power supply efficiency of the redundant power supply control circuit 100 may be enhanced.

When the main power PI1' is provided to the load RL through the turned-on P-type MOSFET MP3, the parasitic diode D2 of the P-type MOSFET MP2 (which is located in the second isolating circuit 122) is reversely biased and thus, is turned off based on that the voltage level of the main power PI1' (first power PI1) is higher than the voltage level of the second power PI2. In addition, as described above, the voltage level of the first switch signal CS1 is equal to the voltage level of the ground terminal GND (e.g., the logic-low voltage level). Thus, the gate terminal of the N-type MOSFET MN2 (which is located in the second isolating circuit 122) receives the logic-low voltage level through the regulating diode D4 and the fourth resistor R24, and the N-type MOSFET MN2 is in a turned-off state, such that the P-type MOSFET MP2 is also in a turned-off state. In other words, when the first power PI1 (i.e., the main power PI1') is provided to the load RL, both the P-type MOSFET MP2 and the parasitic diode D2 therein are in the turned-off state, such that the current path between the load RL and the second power device 920 is disconnected. In this way, the voltage or the current of the main power PI1' (i.e., the first power PI1) may be prevented from flowing back to the second power device 920 through the P-type MOSFET MP2 (or the parasitic diode D2 therein).

Description related to the condition that the power is stopped from being provided to the redundant power supply control circuit 100 by the first power device 910, but by the second power device 920 will be set forth below (i.e., the first power PI1 is not provided, but the second power PI2 is provided). Referring to FIG. 1 and FIG. 2 simultaneously again, in the condition that the second power PI2 is provided, if the first power device 910 stops providing the power, a voltage level of the load RL starts to decrease, and as a result, the parasitic diode D2 is converted to be forward biased and is turned on. Thus, the second power PI2 may be instantly provided to the load RL through the turned-on parasitic diode D2. In this way, the load R (or the electronic apparatus in which the load RL is installed) may be prevented from being shut down due to the first power PI1 being not provided.

Since the first power PI1 is not provided, the voltage level of the second switch signal CS2 obtained by dividing the voltage of the first power PI1 through the resistors R11 and R12 is smaller than the threshold of the regulating triode TD1, such that the regulating triode TD1 is turned off, which causes the P-type MOSFET MP1 to be turned off. In the same way, the voltage level of the third switch signal CS3 obtained by dividing the voltage of the first power PI1 through the resistors R47, R48 and R49 is smaller than the threshold of the N-type MOSFET MN3, such that the N-type MOSFET MN3 is turned off, which causes the P-type MOSFET MP3 to be turned off.

In the aforementioned situation, the parasitic diode D3 inside the P-type MOSFET MP3 is forward biased, and thus, the second power PI2 provided to the load RL through the parasitic diode D2 may be transmitted to the second terminal T12 of the first switch circuit 1211 (i.e., the source terminal of the P-type MOSFET MP1) and the first input terminal I21 of the second control circuit 1222 through the turned-on parasitic diode D3. In this circumstance, the parasitic diode D1 of the P-type MOSFET MP1 is reversely biased and is turned off, the P-type MOSFET MP1 is also turned off, and thus, the current path between the load RL and the first power device 910 is disconnected. In this way, the voltage or the current of the second power PI2 may be prevented from flowing back to the first power device 910 through the P-type MOSFET MP1 (or the parasitic diode D1 therein). On the other hand, the voltage of the second power PI2 may be divided by the third resistor R23, the regulating diode D4 and the fourth resistor R24 of the second control circuit 1222 through the first input terminal I21 to turn on the N-type MOSFET MN2. Then, the voltage of the second power PI2 of the load RL may be divided by the first resistor R21, the second resistor R22 and the turned-on N-type MOSFET MN2 to turn on the P-type MOSFET MP2. Thus, the second power PI2 provided by the second power device 920 may be provided to the load RL through a sensing channel inside the P-type MOSFET MP2. Since an impedance value of the sensing channel inside the P-type MOSFET MP2 is small, and a power consumption thereof is lower than that of the parasitic diode D2, the power supply efficiency of the redundant power supply control circuit 100 may be enhanced.

Description related to the over-voltage protection circuit 160 of the redundant power supply control circuit 100 will be set forth hereinafter. The over-voltage protection circuit 160 is coupled to the soft start circuit 140. The over-voltage protection circuit 160 is configured to generate a fourth switch signal CS4 to disable the soft start circuit 140 when the voltage level of the first power PI1 is greater than an over-voltage protection level, such that the soft start circuit 140 stops outputting the main power PI1' to prevent the internal circuit of the power supply control circuit 100 or the load RL from being damaged due to the overhigh voltage level of the first power PI1 (i.e., the main power PI1').

Furthermore, as illustrated in FIG. 2, the over-voltage protection circuit 160 may include a voltage dividing circuit DV3 and a regulating triode TD3, but the disclosure is not limited thereto. In other embodiments of the disclosure, a capacitor C5 may be further connected between a control terminal and an anode terminal of the regulating triode TD3.

The voltage dividing circuit DV3 may be configured to divide the voltage of the first power PI1 to generate a fifth switch signal CS5. In an embodiment of the disclosure, the voltage dividing circuit DV3 may include resistors R61 and R62 connected in series. A first terminal of the resistor R61 is configured to receive the first power PI1, and a second terminal of the resistor R61 is coupled to a first terminal of the resistor R62 to generate the fifth switch signal CS5. A second terminal of the resistor R62 is coupled to the ground terminal GND. An anode terminal of the regulating triode TD3 is coupled to the ground terminal GND. A control terminal of the regulating triode TD3 is configured to receive the fifth switch signal CS5. A cathode terminal of the regulating triode TD3 is configured to output the fourth switch signal CS4.

When the voltage level of the first power PI1 raises to cause a voltage level of the fifth switch signal CS5 to be greater than a threshold of the regulating triode TD3, the regulating triode TD3 is turned on, such that a voltage level of the fourth switch signal CS4 is equal to the voltage level of the ground terminal GND (e.g., the logic-low voltage level), thereby sequentially turning off the N-type MOSFET MN3 and the P-type MOSFET MP3. In this circumstance, the soft start circuit 140 stops outputting the main power PI1' to the load RL to achieve over-voltage protection. It can be understood that the threshold of the regulating triode TD3 is an over-voltage protection level, and thus, a designer may adjust the over-voltage protection level as desired by using the regulating triode TD3 provided with different thresholds. In an embodiment of the disclosure, the regulating triode TD3 may be implemented by using a TL431 regulating element, but the disclosure is not limited thereto.

In light of the foregoing, the redundant power supply control circuit provided by the embodiments of the disclosure can prevent the voltage or the current of the first power from the first power device from flowing back to the second power device and prevent the voltage or the current of the second power from the second power device from flowing back to the first power device. When the first power is provided, the soft start circuit in the redundant power supply control circuit can be enabled after receiving the main power (i.e., the first power), so as to progressively output the main power to the load, thereby suppressing the inrush current in the transient moment when the first power is provided. In addition, when the voltage level of the first power (i.e., the main power) is too high, the over-voltage protection circuit in the redundant power supply control circuit can disable the soft start circuit to stop the main power from being output, so as to prevent the internal circuit in the redundant power control circuit or the load from being damaged due to the overhigh voltage level of the first power (i.e., the main power).

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A redundant power supply control circuit for providing a power to a load, comprising:
 a power isolating circuit, configured to receive at least one of a first power from a first power device and a second power from a second power device and configured to isolate the first power from the second power, wherein when the first power is provided, the power isolating circuit outputs the first power as a main power and isolates the second power from the load, and when the first power is not provided, the power isolating circuit outputs the second power to the load; and a soft start circuit, coupled to the power isolating circuit to receive the main power and being enabled after receiving the main power, so as to output the main power to the load, wherein the power isolating circuit comprises:

a first isolating circuit, configured to receive the first power from the first power device and coupled to the soft start circuit, wherein when the first power is provided, the first isolating circuit outputs the first power as the main power, and when the first power is not provided, the first isolating circuit disconnects a current path between the soft start circuit and the first power device, wherein the first isolating circuit comprises:

a first switch circuit, having a first terminal configured to receive the first power, and a second terminal coupled to the soft start circuit; and a first control circuit, having an input terminal configured to receive the first power, and an output terminal coupled to a control terminal of the first switch circuit to control turning-on and turning-off of the first switch circuit, wherein when the first power is provided, the first control circuit generates a first switch signal to turn on the first switch circuit, or otherwise, the first control circuit generates the first switch signal to turn off the first switch circuit, wherein the first switch circuit comprises:

a first P-type metal oxide semiconductor field effect transistor (P-type MOSFET), having a drain terminal coupled to the first terminal of the first switch circuit, and a source terminal coupled to the second terminal of the first switch circuit, wherein a parasitic diode is between the drain terminal and the source terminal of the first P-type MOSFET, wherein the first control circuit comprises:

a first voltage dividing circuit, coupled between the input terminal of the first control circuit and a ground terminal and configured to divide a voltage of the first power to generate a second switch signal; and a first regulating triode, having an anode terminal coupled to the ground terminal, a cathode terminal coupled to the output terminal of the first control circuit, and a control terminal configured to receive the second switch signal.

2. The redundant power supply control circuit according to claim 1, wherein the power isolating circuit further comprises:

a second isolating circuit, configured to receive the second power from the second power device and coupled to the load, wherein when the first power is provided, the second isolating circuit disconnects a current path between the load and the second power device, and when the first power is not provided, the second isolating circuit outputs the second power to the load.

3. The redundant power supply control circuit according to claim 2, wherein the second isolating circuit comprises:

a second switch circuit, having a first terminal configured to receive the second power, and a second terminal coupled to the load; and a second control circuit, having a first input terminal coupled to the soft start circuit, a second input terminal coupled to the first control circuit to receive the first switch signal, and an output terminal coupled to a control terminal of the second switch circuit to control turning-on and turning-off of the second switch circuit, wherein when the first power is provided, the second control circuit turns off the second switch circuit according to the first switch signal, or otherwise, the second control circuit turns on the second switch circuit.

4. The redundant power supply control circuit according to claim 3, wherein the second switch circuit comprises:

a second P-type MOSFET, having a drain terminal coupled to the first terminal of the second switch circuit, and a source terminal coupled to the second terminal of the second switch circuit, wherein a parasitic diode is between the drain terminal and the source terminal of the second P-type MOSFET;

a first resistor, having a first terminal coupled to the source terminal of the second P-type MOSFET, and a second terminal coupled to a gate terminal of the second P-type MOSFET;

a second resistor, having a first terminal coupled to the gate terminal of the second P-type MOSFET; and an N-type metal oxide semiconductor field effect transistor (N-type MOSFET), having a drain terminal coupled to a second terminal of the second resistor, a source terminal coupled to the ground terminal, and a gate terminal coupled to the control terminal of the second switch circuit, the second control circuit comprises:

a third resistor, having a first terminal coupled to the first input terminal of the second control circuit, and a second terminal coupled to the second input terminal of the second control circuit;

a regulating diode, having a cathode terminal coupled to the second input terminal of the second control circuit, and an anode terminal coupled to the output terminal of the second control circuit; and a fourth resistor, having a first terminal coupled to the output terminal of the second control circuit, and a second terminal coupled to the ground terminal.

5. The redundant power supply control circuit according to claim 1, wherein the soft start circuit comprises:

a third switch circuit, having a first terminal coupled to the load, and a second terminal coupled to the power isolating circuit; and a third control circuit, configured to receive the first power and coupled to a control terminal of the third switch circuit to control turning-on and turning-off of the third switch circuit, wherein when the first power is provided, the third control circuit generates a third switch signal to turn on the third switch circuit, or otherwise, the third control circuit generates the third switch signal to turn off third switch circuit.

6. The redundant power supply control circuit according to claim 5, wherein the third switch circuit comprises:

a second P-type MOSFET, having a drain terminal coupled to the first terminal of the third switch circuit, and a source terminal coupled to the second terminal of the third switch circuit, wherein a parasitic diode is between the drain terminal and the source terminal of the second P-type MOSFET;
a fifth resistor, having a first terminal coupled to the source terminal of the second P-type MOSFET, and a second terminal coupled to a gate terminal of the second P-type MOSFET;
a sixth resistor, having a first terminal coupled to the gate terminal of the second P-type MOSFET; and
an N-type MOSFET, having a drain terminal coupled to a second terminal of the sixth resistor, a source terminal coupled to the ground terminal, and a gate terminal coupled to the control terminal of the third switch circuit,
the third control circuit comprises:
a second voltage dividing circuit, configured to divide the voltage of the first power to generate the third switch signal.

7. The redundant power supply control circuit according to claim 1, further comprising:
an over-voltage protection circuit, coupled to the soft start circuit and configured to generate a fourth switch signal to disable the soft start circuit when a voltage level of the first power is greater than an over-voltage protection level, such that the soft start circuit stops outputting the main power.

8. The redundant power supply control circuit according to claim 7, wherein
the over-voltage protection circuit comprises:
a second voltage dividing circuit, configured to divide the voltage of the first power to generate a fifth switch signal; and
a second regulating triode, having an anode terminal coupled to the ground terminal, a control terminal configured to receive the fifth switch signal, and a cathode terminal configured to generate and output the fourth switch signal.

* * * * *